(12) United States Patent
Tofinetti et al.

(10) Patent No.: US 8,271,883 B2
(45) Date of Patent: Sep. 18, 2012

(54) INTELLIGENT AUTO-CREATION OF NEW PORTLETS

(75) Inventors: Michael N. Tofinetti, Kanata (CA); Katha Kulasingam, Kanata (CA); David Kiesekamp, Merrickville (CA)

(73) Assignee: Alcatel Lucent, Paris (FR)

(*) Notice: Subject to any disclaimer, the term of this patent is extended or adjusted under 35 U.S.C. 154(b) by 260 days.

(21) Appl. No.: 12/827,539

(22) Filed: Jun. 30, 2010

(65) Prior Publication Data
US 2012/0005620 A1    Jan. 5, 2012

(51) Int. Cl.
*G06F 3/00* (2006.01)
(52) U.S. Cl. .................... 715/742; 715/744; 715/745
(58) Field of Classification Search .............. 715/738, 715/742, 744, 745, 762, 765
See application file for complete search history.

(56) References Cited

U.S. PATENT DOCUMENTS

| 7,376,900 | B2 * | 5/2008 | Guido et al. ............ 715/742 |
| 7,904,818 | B2 * | 3/2011 | Lauridsen et al. ........ 715/742 |
| 2009/0044114 | A1 * | 2/2009 | Ames et al. ............ 715/709 |
| 2009/0070713 | A1 * | 3/2009 | Whitman et al. ........ 715/854 |
| 2010/0217777 | A1 * | 8/2010 | Kussmaul et al. ........ 707/776 |
| 2010/0325532 | A1 * | 12/2010 | Cohen ............. 715/234 |
| 2011/0055704 | A9 * | 3/2011 | Guido et al. ............ 715/733 |
| 2011/0078708 | A1 * | 3/2011 | Dokovski et al. ........ 719/329 |
| 2011/0131501 | A1 * | 6/2011 | Lauridsen et al. ........ 715/738 |

OTHER PUBLICATIONS

U.S. Appl. No. 12/707,865, filed Feb. 18, 2010, Tofinetti et al.
U.S. Appl. No. 12/707,845, filed Feb. 18, 2010, Tofinetti et al.

* cited by examiner

*Primary Examiner* — Ba Huynh
(74) *Attorney, Agent, or Firm* — Marks & Clerk

(57) ABSTRACT

A method is provided for keeping presentation of information to a minimum. A perspective comprises areas, and each area can have one or more portlets which display information. Each area has an associated list of portlet types that can be instantiated within the area. Each portlet can be manually placed into or out of a locked state. Various portlets can also be in a dirty state if they contain unsaved information, such as in a partially completed form. When a new portlet is to be added to the perspective, first an area which supports creation of that type of portlet is selected. The existing portlets within that area are then examined, and if one exists which is not locked and is not dirty, then it is replaced with the new portlet. If no such existing portlet is eligible for replacement, then the new portlet is created and added to the existing portlets. In this way, portlets in which a user is no longer interested may be replaced with newer portlets of more immediate interest, thereby reducing clutter within the perspective view of the information.

4 Claims, 3 Drawing Sheets

INTELLIGENT AUTO-CREATION OF NEW PORTLETS

FIELD OF THE INVENTION

This invention relates to graphical user interfaces, and more particularly to a method of displaying multiple pieces of information.

BACKGROUND OF THE INVENTION

Management of customer information in telecommunication networks often requires the presentation of many pieces of information. For example, information related to billing rates and expected levels of service must be presented to an administrator so that the administrator can obtain current information or can edit information stored in a database. The information may be presented as lines of text, but a graphical user interface allows an administrator to select various items, to more easily view the current state of the selected items, and to more easily change the information related to the selected items.

The flexibility given to the administrator may come at a cost, however. As the administrator selects different views of the information, different aspects of the information presented to the administrator in different windows may become difficult to manage, especially when the administrator starts moving the windows around. For example, the administrator may wish to view information concerning a particular subscriber in a telecommunication network. A Listing window is used to find existing subscribers or to create new ones. Individual subscribers are created or edited in forms specific to the subscriber data. These forms contain many fields, such as category, user identifier, description, a list of subscription identifiers, custom data, and a list of called station identifiers. Each of these called station identifiers contains a large amount of information dealing with Quality of Service (QoS) parameters: defaults, aggregate maximum bit rates, guaranteed bit rates, maximum bit rates for QoS classes, associated AF applications, and custom data. Many of these are lists which open up configuration forms of their own. In addition, there is a separate search facility to find a subscriber by a specific subscription identifier. This is a search window which opens on top of the subscriber list.

U.S. patent application Ser. No. 12/707,865, entitled "Perspective View", filed on Feb. 18, 2010, and incorporated herein by reference, provides a solution to presenting many pieces of data. Information is presented in portlets organized within areas such that different portlets can be selected easily. The areas form a perspective, such that different areas, and hence different portlets, can be viewed simultaneously.

However, creation of a new portlet is not explicitly addressed in U.S. patent application Ser. No. 12/707,865. Simply creating a new portlet, or any window for that matter, may lead to a cluttered view if many portlets are open simultaneously, which may even be unnecessary. A method of displaying and creating portlets, that is sets of information, in a clear way would make it easier for an administrator to manage information, for example customer information in a telecommunication network.

SUMMARY OF THE INVENTION

According to one aspect, the invention provides a method of displaying a new portlet in a perspective, the perspective containing at least one area, at least one which contains at least one existing portlet. One of the existing portlets is set to a locked state upon selection of an option by a user. One of the existing portlets is set to a dirty state upon the user entering data into at least one field of the portlet. One selected area from amongst the areas is selected, the selected area being one for which a list of types of portlets which can be created in the area includes the type of the new portlet. It is determined whether the selected area contains at least one eligible portlet, an eligible portlet being an existing portlet that is neither in a dirty state nor in a locked state. If the selected area contains at least one eligible portlet, one of the at least one eligible portlet is replaced with the new portlet. If the selected area contains no eligible portlets, the new portlet is added to the selected area.

In one embodiment, an eligible portlet is further constrained as a portlet that has no open child portlets.

In another embodiment, the selected area contains at least two existing portlets, one of which is visible. Determining whether the selected area contains at least one eligible portlet comprises determining if the existing portlet which is visible is an eligible portlet, and if not, starting at the left-most existing portlet which is not visible and determining whether each existing portlet which is not visible is an eligible portlet until either an eligible portlet is found or all existing portlets have been evaluated as to whether the portlet is eligible.

The methods of the invention may be stored as processing instructions on computer-readable storage media, the instructions being executable by a computer processor.

The invention allows information to be presented to a user in a way which is easy for the user to manage. By allowing portlets to be locked and to be marked as "dirty", portlets can be replaced when a new portlet is created while protecting certain portlets. In addition, new portlets may only be created in areas that support such portlets. A set of rules for treating new portlets is provided. Clutter is avoided by reducing the number of portlets, yet protection of certain portlets ensures that reduction of clutter is done without removing important data from view.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
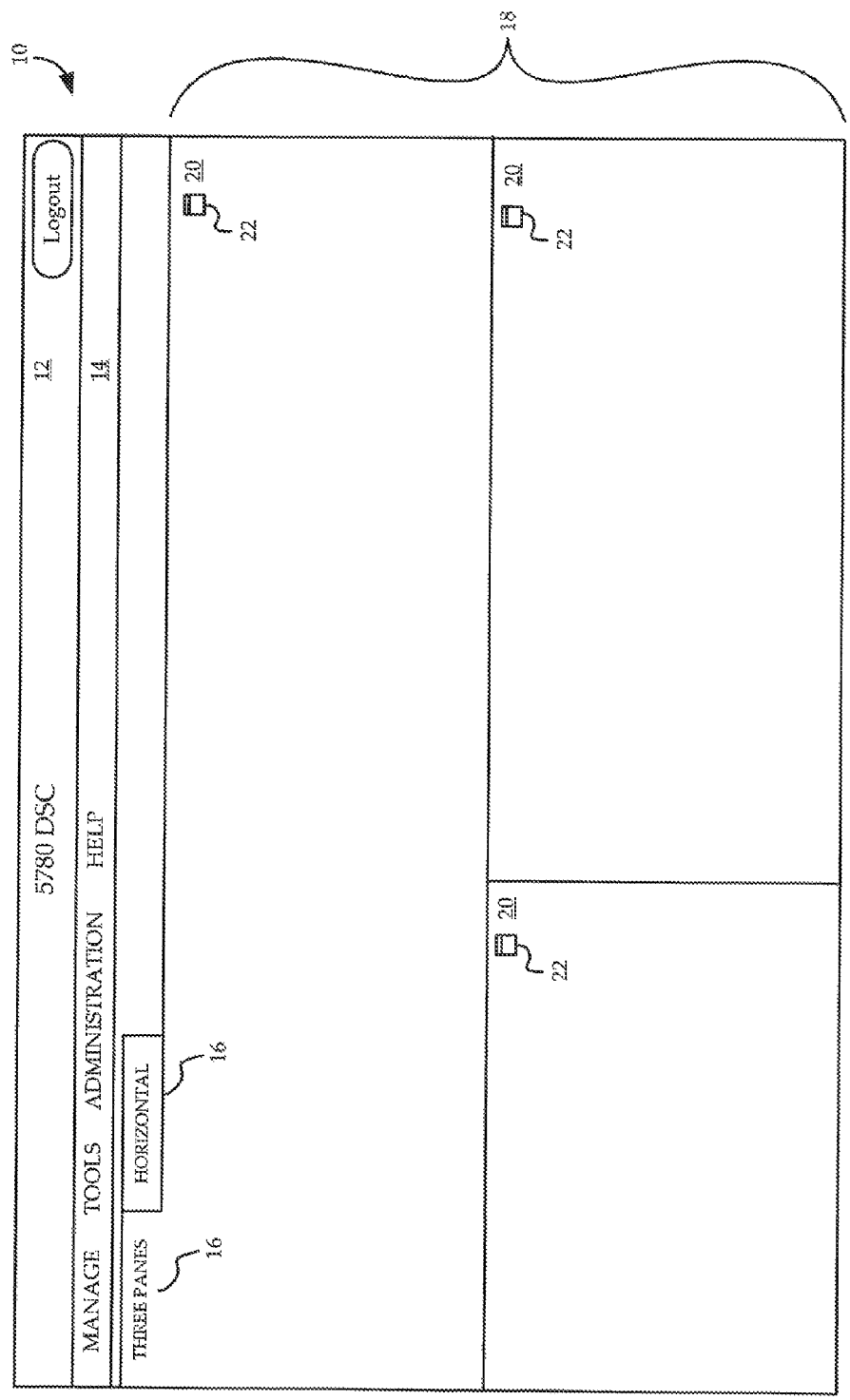
FIG. 1 is a diagram of an example perspective.

Referring to FIG. 1, a diagram of an example perspective is shown. At the top level a user is presented with an application interface 10. Preferably, the application interface 10 occupies the entire display area of a display device. The application interface 10 includes a title bar 12, a menu bar 14, one or more tabs 16 called "perspective tabs", and one or more stacked views called "perspectives" 18. Each perspective tab 16 has an associated perspective 18, and selecting one of the perspective tabs makes the perspective 18 associated with that perspective tab visible. Each perspective is an overall view of some aspect of information. Only one perspective is displayed, but if more than one perspective is available then the user can select a particular perspective to be displayed using the perspective tabs. In the example shown in FIG. 1, the user can select between two perspectives. The available perspectives may be either predefined or may be generated by the user. Generation of a perspective by a user provides flexibility in what data the user sees or interacts with.

Each perspective contains at least one pane, termed an "area". In the example shown in FIG. 1, the perspective 18 contains three areas 20. Within a displayed perspective 18, the areas 20 may be resized but in general may not be created or destroyed. In other words, the number of areas within each perspective is normally fixed, but more generally a user may create one or more areas within a perspective. The definition of each area includes the types of portlet (described below) permitted in the area, in other words the types of portlet that can exist or be created within the area. Each area has two list definitions for this purpose, one of which lists the types of portlets which can be created within the area and one of which lists the types of portlets which can exist within the area. Either list may indicate that all portlet types can be created or are allowed, either by explicitly listing all the portlet types or by listing a special value. For example, the list of types of portlets which can exist within an area may be empty, which indicates that all types of portlets can exist within the area. Examples of types of portlets are Lists, Forms, and Trees.

Each area also has a maximize icon 22 for maximizing the area to occupy the entire perspective view, at which point a normalize icon (not shown in FIG. 1) becomes visible or selectable for restoring the area to its normal size. For certain purposes, as described below, the areas are ordered.

Figure 2:
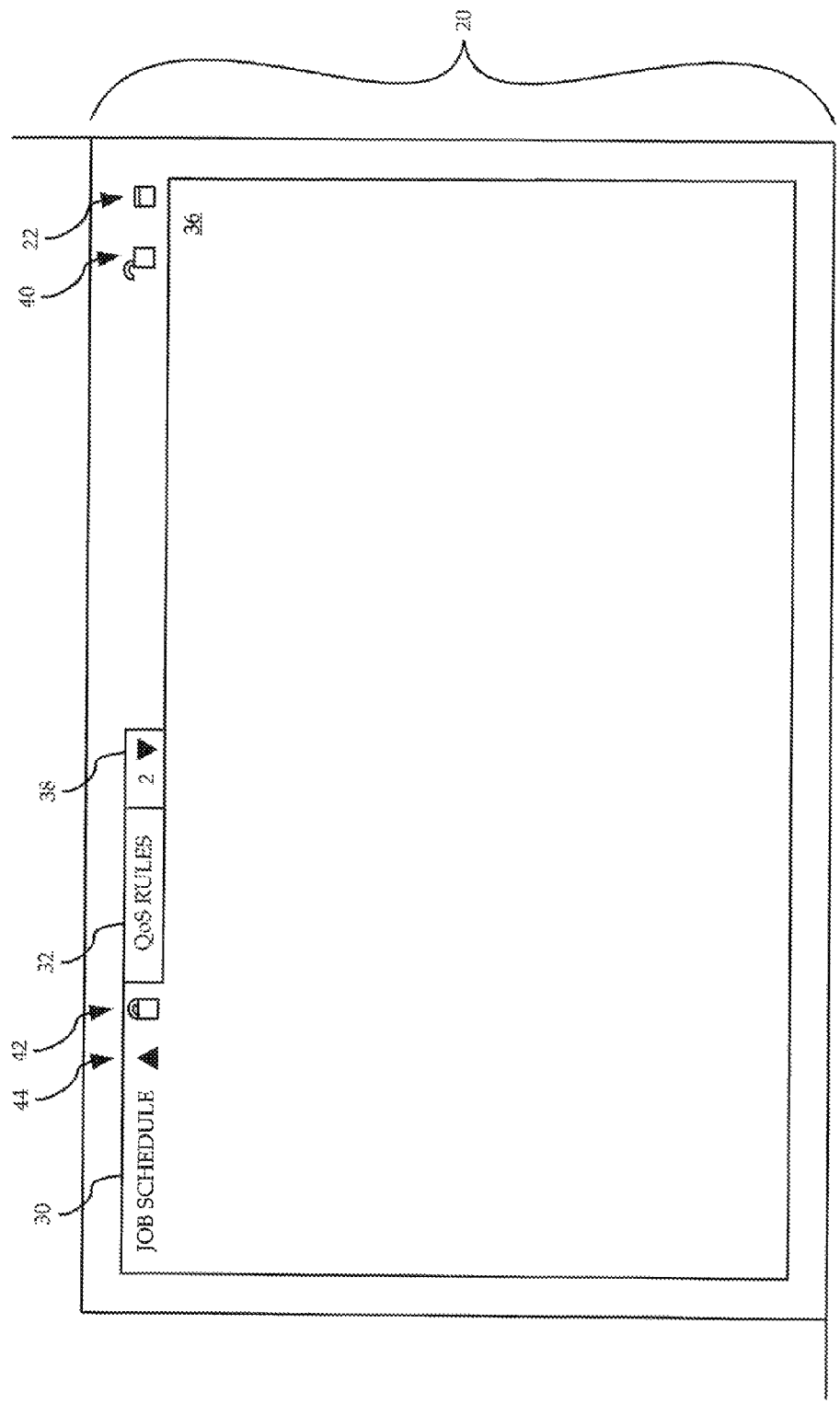
FIG. 2 is a diagram of an example area according to one embodiment of the invention.

Referring to FIG. 2, a diagram of an example area 20 according to one embodiment of the invention is shown. The area may include at least one tab 30 and 32 called a "portlet tab", and at least one stacked panel called a "portlet" 36, although any number of areas within the perspective may have no portlet tabs or associated portlets. If a portlet tab is not visible due to width constraints of the area in which the portlet tab would otherwise be present, then a drop-down list 38 containing identifications of additional portlets is used. Each portlet tab and if present each item in the drop-down list has an associated portlet, and selecting one of the portlet tabs or an item in the drop-down list makes the portlet 36 associated with that portlet tab or item visible. Each portlet is a display of information, either information directly from a database or derived from information in the database. Only one portlet is displayed within each area, but if more than one portlet is available then the user can select a particular portlet to be displayed using the portlet tabs or drop-down list within the area. In the example shown in FIG. 2, the user can select between four portlets in the area, although selection of a portlet for viewing in an area does not affect which portlets are selectable or visible in other areas.

Each portlet presents information of a type specific to that portlet. A portlet can be a list of information or a form presenting current information and allowing the current information to be changed. Changing information in a portlet, such as a form, does not affect the same information being displayed in another portlet.

Portlets can be destroyed in an area and can be added to an area. A portlet can also be moved between areas by clicking and dragging the portlet to a destination area, as long as the type of portlet is allowed in the destination area as indicated by the list of types of portlets which can exist within the area.

Each portlet can be placed in locked state. A portlet can be placed in or taken out of a locked state by the user actively altering the locked state of the portlet by selecting an icon 40. Selection of the icon 40 switches whether the currently visible portlet is in a locked state, either placing the portlet in a locked state or taking the portlet out of a locked state. When a portlet is in a locked state, an icon 42 appears on the tab of the portlet. When a portlet is not in a locked state, the icon is not shown.

Each portlet can also be in a dirty state. If the portlet is a form, then the portlet enters a dirty state when the user enters data into at least one field of the form. When a portlet is in a dirty state, an icon 44 appears on the tab of the portlet. When information entered by the user is saved or cleared, for example using respective buttons associated with the portlet, the portlet is taken out of the dirty state.

A perspective manager is responsible for displaying the selected perspective to the user. When a portlet is to be created, such as by selecting a specific menu item but more generally in any way, the perspective manager considers which portlet types can be created in each area in the perspective currently being displayed. The perspective manager searches through the list of areas in the perspective currently being displayed to determine the first such area for which the type of portlet being created is listed in the area's list of types of portlets which can be created in the area.

Broadly, when a new portlet is created, the first area in which the type of portlet being created is listed in the area's list of portlets which can be created in the area is determined. The portlets existing in the area are searched until an existing portlet eligible for replacement is found. The new portlet is then created and the existing portlet eligible for replacement is removed. A portlet is eligible for replacement if the portlet is not in a locked state, is not in a dirty state, and has no child portlets. If no portlet eligible for replacement is found, then the new portlet is created by adding it to the existing portlets. Other rules may also apply to creation of the new portlet, such as determining the location in the area in which the new portlet is added if it is not replacing an existing portlet.

Figure 3:
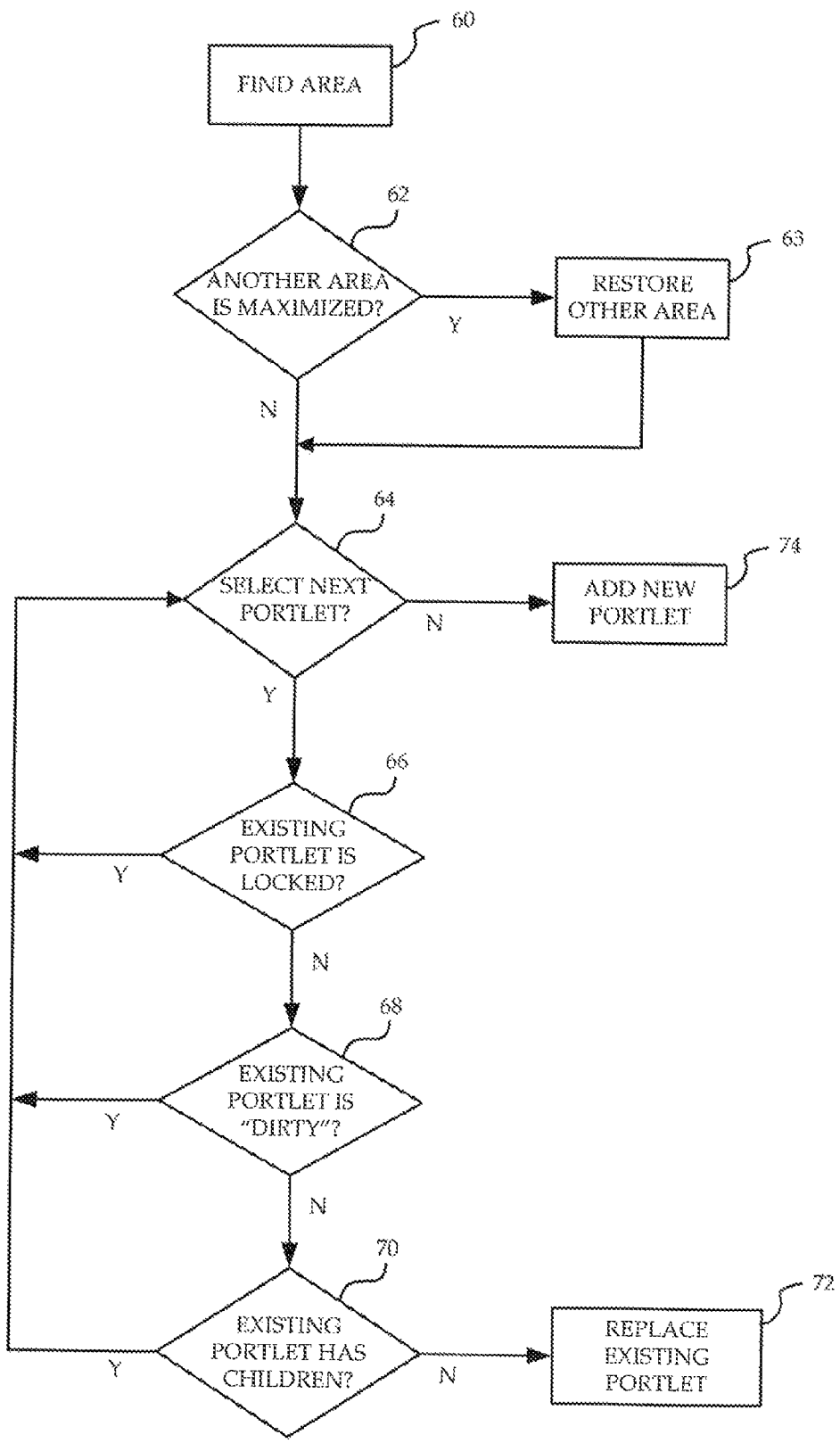
FIG. 3 is a flowchart of a method by which a portlet is created.

Referring to FIG. 3, a flowchart of a method carried out when a new portlet is created is shown according to one embodiment of the invention. The method is initiated when a new portlet is to be created, such as selection of a menu item or, if implemented, selecting an item in an existing portlet. At step 60 the first area for which the type of portlet to be created is within the list of types of portlets than can be created in the area is determined. The perspective 18 is defined such that all possible types of portlets are included in at least one list of types of portlets that can be created. Alternatively, if there exists a type of portlet that cannot be created in any area of the perspective 18, then the option to create a portlet of that type is not presented to a user.

At step 62 it is determined if there is another area that is already maximized. If so, then at step 63 this other area is restored to its default size, so that the area determined at step 60, i.e. the area in which the new portlet is to be located, is visible. If there is no other area that has been maximized, then the areas are not resized. This will happen if the area in which the new portlet is to be located is the one that is maximized, in which case this area will remain maximized, or if none of the areas is maximized.

At step 64 it is attempted to select the next existing portlet. The order in which existing portlets are selected is the portlet that is current being displayed, followed by portlets as indicated by their portlet tabs in order from left to right, followed by the remaining portlets as indicated in any drop down menu. Other orders in which portlets are selected are of course permissible. There may also be no portlet tabs within the selected area, in which case there no next existing portlet to select.

If an existing portlet can be selected at step 64, then at step 66 it is determined whether the selected portlet is in a locked state. If the selected portlet is in a locked state, then the selected portlet cannot be replaced and an attempt is made to select the next existing portlet at step 64.

If the selected portlet is not in a locked state, then at step 68 it is determined whether the selected portlet is in a dirty state. If the selected portlet is in a dirty state, then the selected portlet cannot be replaced and an attempt is made to select the next existing portlet at step 64.

If the selected portlet is not in a dirty state, then at step 70 it is determined whether the selected portlet has any child portlets. The selected portlet will have child portlets if the selected portlet has content that refers to other portlets and any of those other portlets are open. If the selected portlet has any child portlets, then the selected portlet cannot be replaced and an attempt is made to select the next existing portlet at step 64.

Collectively, the determinations made at steps 66, 68, and 70 can be viewed simply as a single determination as to whether the selected portlet is eligible to be replaced. The selected portlet is eligible to be replaced if it is not locked, is not dirty, and has no child portlets. More generally, the existence of the determination as to whether the portlet has any child portlets depends on whether selection of an item in a portlet can open another portlet. If this feature is not implemented, i.e. a portlet cannot be created by selecting an item in an existing portlet, then the selected portlet is eligible to be replaced if it is not locked and it is not dirty.

If it is determined that the selected portlet is eligible to be replaced, then at step 72 the selected portlet is removed and the new portlet created in its place, thereby preserving the number of portlets in the area. If the selected portlet being replaced is not visible within the area then the new portlet is made visible, which may require making another portlet having a portlet tab accessible instead through a drop-down menu 38.

If it determined that there is no next portlet at step 64, then the newly created portlet is added to the area at step 74. This will likely happen because none of the existing portlets in the area are eligible for replacement. The newly created portlet is added to the area along with a new portlet tab associated with the new portlet. If there is insufficient space for the new portlet tab, then at least one of the existing portlet tabs is removed from the list of portlet tabs, and each portlet associated with the removed at least one portlet tab is made accessible only through a drop-down menu 38. Any method may be used to select portlet tabs to be removed. One such method is to start at the left-most portlet tab, and remove it and additional portlet tabs moving to the right until there is sufficient room to display the new portlet tab.

The logic of the methods is preferably in the form of software, and may be stored as instructions on computer-readable storage media which can cause a computer processor to create portlets in the manner described herein. The information presented in the portlets may be information about customers in a telecommunication network, which may be obtained from a database, or may be any other sort of information.

The embodiments presented are exemplary only and persons skilled in the art would appreciate that variations to the embodiments described above may be made without departing from the spirit of the invention. For example, the various menus, title bars, and icons described above and shown in the figures are examples only, and other text and/or icons can be used. Methods which are logically equivalent to the method described with reference to FIG. 3 may be used. The scope of the invention is solely defined by the appended claims.

We claim:

1. A method of displaying a new portlet in a perspective, the perspective containing at least one area, at least one which contains at least one existing portlet, comprising:
    setting one of the existing portlets to a locked state upon selection of an option by a user;
    setting one of the existing portlets to a dirty state upon the user entering data into at least one field of the portlet;
    selecting one selected area from amongst the at least one area, the selected area being one for which a list of types of portlets which can be created in the area includes the type of the new portlet;
    determining whether the selected area contains at least one eligible portlet, an eligible portlet being an existing portlet that is neither in a dirty state nor in a locked state;
    if the selected area contains at least one eligible portlet, replacing one of the at least one eligible portlet with the new portlet; and
    if the selected area contains no eligible portlets, adding the new portlet to the selected area.

2. The method of claim 1 wherein an eligible portlet is further constrained as a portlet that has no open child portlets.

3. The method of claim 1 wherein the selected area contains at least two existing portlets, one of which is visible, and wherein determining whether the selected area contains at least one eligible portlet comprises:
    determining if the existing portlet which is visible is an eligible portlet;
    if the existing portlet which is visible is not an eligible portlet, starting at the left-most existing portlet which is not visible and determining whether each existing portlet which is not visible is an eligible portlet until either an eligible portlet is found or all existing portlets have been evaluated as to whether the portlet is eligible.

4. The method of claim 1 wherein the perspective contains at least two areas, and the method further comprising:
    determining whether one of the at least one area which is not the selected area is maximized; and
    if one of the at least one area which is not the selected area is maximized, restoring that area to its normal size.

* * * * *